Aug. 13, 1957 S. C. BERRY 2,802,601
APPARATUS FOR HANDLING FLUENT MATERIALS
Filed Aug. 27, 1956 3 Sheets-Sheet 1

INVENTOR
SAMUEL C. BERRY

BY W.E. Sherwood
ATTORNEY

Aug. 13, 1957 S. C. BERRY 2,802,601
APPARATUS FOR HANDLING FLUENT MATERIALS
Filed Aug. 27, 1956 3 Sheets-Sheet 2
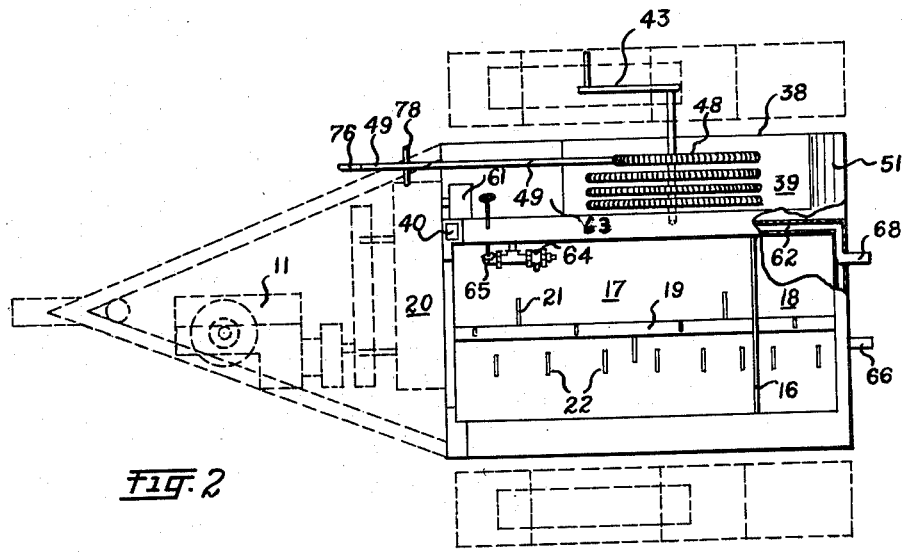
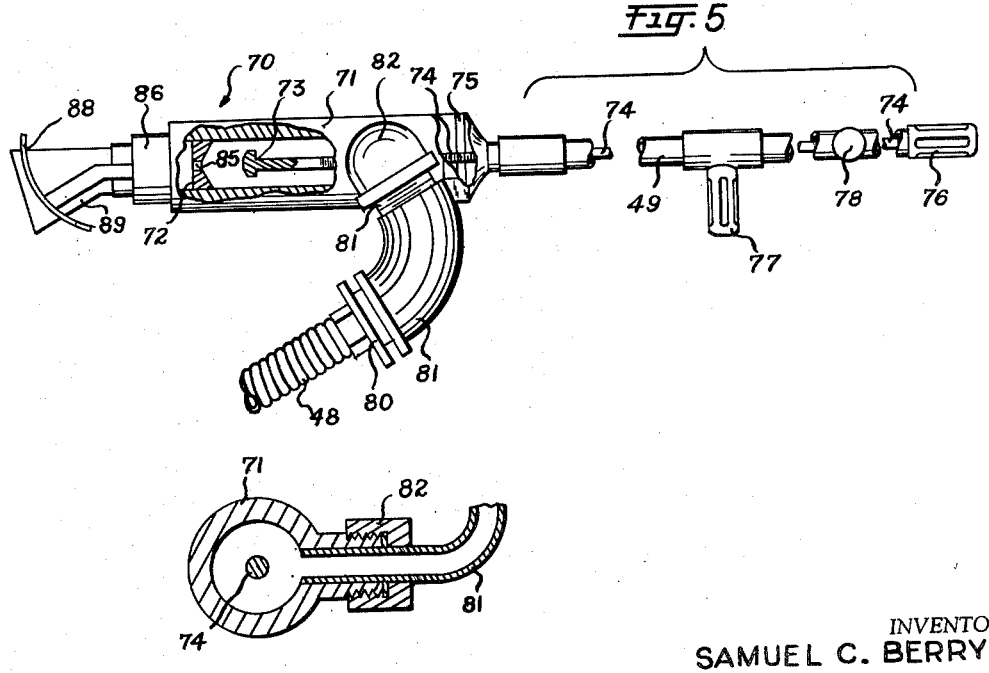
INVENTOR
SAMUEL C. BERRY
BY W. E. Sherwood
ATTORNEY Aug. 13, 1957  S. C. BERRY  2,802,601
APPARATUS FOR HANDLING FLUENT MATERIALS
Filed Aug. 27, 1956  3 Sheets-Sheet 3

INVENTOR
SAMUEL C. BERRY

BY W. E. Sherwood
ATTORNEY

United States Patent Office 2,802,601
Patented Aug. 13, 1957

2,802,601

APPARATUS FOR HANDLING FLUENT MATERIALS

Samuel C. Berry, Lexington, Ky.

Application August 27, 1956, Serial No. 606,446

10 Claims. (Cl. 222—131)

This invention relates to an improved apparatus for handling fluent materials and more particularly to means for treating and dispensing in molten liquid form, a material which normally is in a solid state.

My invention is especially adapted for the handling of hot, viscous, plastic compositions such as used in sealing expansion joints in paving. However, as the description proceeds, it will be noted that, in its broader aspects, the invention may be employed in other usages wherein the safe and reliable handling of hot plastic materials is of general interest. While various means have been proposed heretofore for providing a mass of fluent sealing composition and for applying the same to the desired location, all such means, of which I am aware, have had certain inherent disadvantages which it is a purpose of this invention to overcome. One obvious disadvantage is the laborious and often dangerous practice of having the operator working in close contact with the hot viscous material. While various means have been developed for dispensing the material from a portable machine carrying a remotely controlled dispensing means and travelling along the path of application, such machines have not been entirely satisfactory. One reason advanced is that optimum results are best obtained by the conscious control exerted by an operator viewing and governing the dispensing from a position closely adjacent the point of application and such machines fail to provide for this desirable control. The use of extensible hoses for carrying the material from a reservoir and controlled by the operator at the point of application also is well known but such hoses, which generally are of metal, become hot; have hot plastic sticking to their surface and are unwieldly to manipulate; with the result that the operator may suffer painful burns unless care is used. Moreover, the desired exercise of care often contributes to slow work.

As a further problem encountered in this field, the plastic material frequently is of a type highly sensitive to heat and which must be kept at the proper temperature at all times lest it be degregated by too much heat or harden into a solid mass by too little heat.

Accordingly, the invention has as one object the provision of an improved apparatus for maintaining a supply of readily dispensable fluent material in a desired usable condition.

Another object is to provide an improved apparatus for dispensing a fluent material in a desired condition and in a safe and expeditious manner.

Another object is to provide an improved reservoir and recirculation system for handling molten material.

Another object is to provide an improved mounting arrangement for an extensible dispensing hose containing molten material.

A further object is to provide an improved valve control on an extensible hose containing molten material.

A further object is to provide an improved means for alternately or simultaneously heating a reservoir and an extensible hose containing molten material.

A still further object is to provide an improved nozzle and attachment thereof for use with an extensible hose containing molten material.

These and other objects will become more apparent as the description proceeds and when considered in conjunction with the accompanying drawings in which:

Fig. 2 is a top plan view of the apparatus with parts broken away to show internal structure and with the hose shown in coiled form.

Fig. 5 is a view showing the dispensing means attached to the hose, parts being shown in section and in detached relation.

Fig. 7 is sectional view showing a portion of the swivel connection between the hose and the dispensing valve housing.

Figure 1:
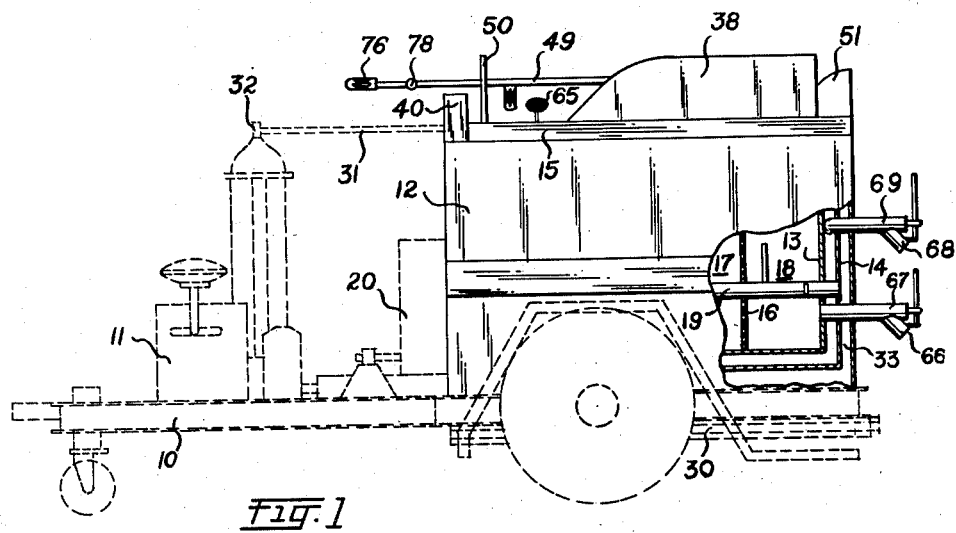
Fig. 1 is a side elevation view of an apparatus for handling fluent materials, parts being broken away to show internal structure.

Materials employed in filling expansion joints in pavements are well known and may include a mixture of rubber, asphalt, pitch or the like, hereinafter referred to generally as plastic material. Frequently, these materials are supplied in solid form and must be melted under controlled heating conditions; maintained in fluent form by continued application of heat; and dispensed continuously after being melted in order to avoid setting up into a solid mass in the dispensing apparatus prior to application in the paving crevice. The preferred embodiment of my invention makes possible the handling of such materials in an improved manner in both hot or cold weather. As shown in Fig. 1, it includes a conventional wheeled vehicle adapted to be towed to a point of use and having a framework 10 mounting a small engine 11 and a material reservoir 12. It will be understood that the vehicle is not intended to serve for dispensing directly into the paving crevice by movement therealong, but on the contrary is moved only to the general area of the work and supplies fluent material into a manually guidable hose which dispenses into the paving crevice.

The reservoir includes an inner wall 13 and an outer wall 14 forming a heating jacket in which a suitable body of liquid heat transfer medium, such as an oil, may be contained. A hinged lid 15 on the reservoir provides for supply of the usable material in solid form into the reservoir and an outer casing of suitable configuration surrounds the reservoir and its heating means. Adjacent one end of the reservoir, a perforated screen or the like, 16 is mounted, thus dividing the reservoir into a first region 17 in which incompletely fluent material may be confined and into a second region 18 in which completely fluent material may be confined.

Extending longitudinally of the reservoir is an agitator shaft 19 suitably mounted for rotation in the end walls and screen of the reservoir and driven by engine 11 through a conventional clutch controlled drive 20. Shaft 19 preferably carries agitator blades 21 for stirring and lifting the plastic material in either or both of the reservoir regions and may coact with stationary inclined bars 22 for shearing the material engaged therebetween. In region 17, as noted in Fig. 2, the coaction of blades 21 and bars 22 serves especially to cut through and comminute chunks of solid plastic material which has not been completely melted, whereas, in region 18 they serve to further subdivide stringy fluent material which has melted sufficiently to pass through screen 16.

Beneath the outer shell or wall 14 of the reservoir, a suitable heater 30, adapted to burn a suitable fuel such as bottled gas, is mounted. This heater serves to heat the heat transfer medium in the jacket between the inner and outer walls, and which medium in turn transfers heat to the fluent plastic material. In general, the plastic material may be heated to temperatures in the order of 450° F. during normal usage and may be held at pressures in the order of 80 p. s. i. as will later be disclosed. Appropriate thermostatic and pressure controls may be employed to hold the heat transfer medium at its optimum heat and pressure levels. Accordingly, it will be apparent that the improved features of my invention which contribute to the safe handling of the hot plastic material are of especial significance.

Figure 3:
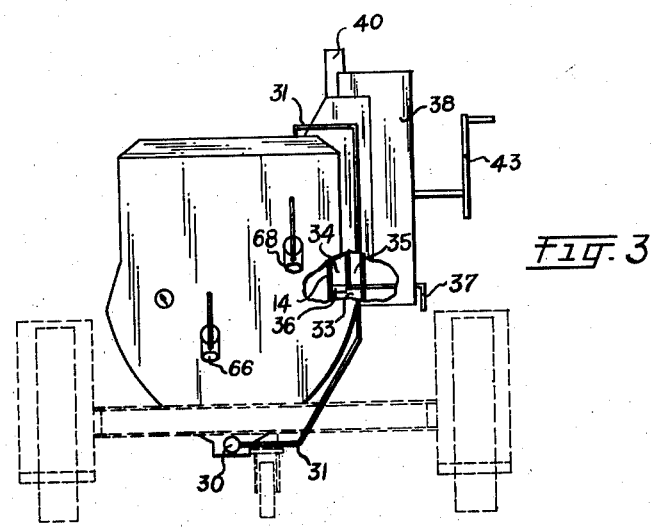
Fig. 3 is an end view of the apparatus with parts broken away to show the flow of heating gases.

Heater 30 is supplied by a gas line 31 extending from a cylinder 32 of bottled gas suitably carried on the vehicle and through an aspirator, not shown, distributes a combustible mixture through the combustion chamber lengthwise of the outer wall of the reservoir. Hot exhaust gases pass through the exhaust space 33 at one side of the reservoir and into either or both of the exhaust passages 34 and 35, best seen in Figs. 3 and 6. The selective flow of these hot exhaust gases is controlled by a damper 36 actuated by a handle 37 at one side of the structure. Mounted upon the side of the reservoir is a hose housing 38 having a space 39 therein communicating with exhaust passage 35. Exhaust passage 34 leads to an upstanding vent stack 40. It will thus be seen that when damper 36 occupies the position of Fig. 3, hot exhaust gases flow into passage 35 and thence into the space within the hose housing 38, heating the hose and its contents, and then exhaust into the ambient atmosphere through the open top of that housing. When the damper is moved fully to the right, communication with passage 35 is interrupted and the gases then flow into passage 34 and out of stack 40. Intermediate setting of the damper permits flow into both of passages 34 and 35.

Figure 6:
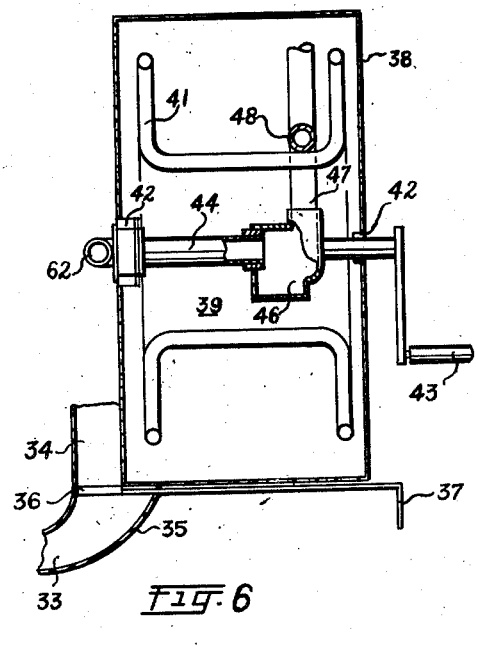
Fig. 6 is a side elevation view partly in section, and to a larger scale showing the hose housing and damper control for waste heat.

As seen in Fig. 6, hose housing 38 contains a rotatable reel 41 centrally mounted upon bearings 42 in the housing walls and manually operable by handle 43. A stationary pipe 44 leads fluent material under pressure from recirculating pipe 62 into a rotatable joint 46 from which extends a short pipe 47 connected to one end of hose 48. This hose preferably is of the flexible armored type suitable for resisting abrasion and wear when dragged along the paving surface. It may have interior or exterior insulation, or both, as found in conventional hoses employed for similar usages. In any event, it must withstand substantial pressures of the hot plastic contained therein. As an illustration, the reel may have a capacity for 15 or 30 feet of hose and thus sustain an appreciable weight of hose and contents.

Attached to the dispensing end of hose 48 is an improved remotely controlled dispensing means, later to be described, and including an elongated rod 49. I prefer to employ a rod having a length of approximately five feet so that the operator may simultaneously be at an operating station which is visually adjacent the point of application, but which also is remotely located with respect to the hot hose. As noted in Fig. 1, this rod remains attached to the hose at all times and is carried in a suitable rest 50 when the hose is in stowed, inoperative position. When extending the hose for operation, the rod is disengaged from the rest and moved to the rear of the vehicle, thus unwinding the hose toward the rear and permitting the pulling of the hose over an arcuate guiding surface 51 at the rear of the hose housing.

Figure 4:
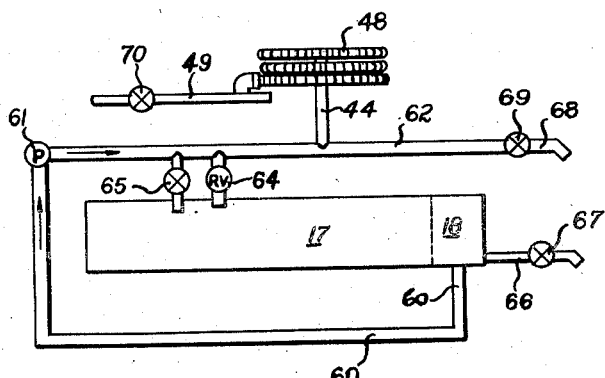
Fig. 4 is a diagrammatic view of the flow path for the fluent material.

Referring now to Fig. 4, the flow of plastic material within the pipe system of the apparatus is shown generally. From the lower part of the reservoir region 18 the hot fluent material is drawn into pipe 60 by pump 61 mounted on an enclosure 63 on the side of the reservoir. The pump is driven by drive means 20 of any conventional construction actuated by engine 11. This pump and its connections are heated by exhaust gases from exhaust space 33, similarly to the heating afforded to the hose in housing 38. A suitable damper and gas passages (not shown) similar to damper 36 and passages 34 and 35 may be provided for this purpose. Under action of the pump the fluent material passes into recirculating pipe 62. With all discharge connections closed, the pump continues to recirculate material after the described piping is filled. As a feature of the invention, pipes 60 and 62 preferably are mounted within the jacket between walls 13 and 14 of the reservoir and in contact with the hot heat transfer medium contained therein.

A pressure relief valve 64 connects pipe 62 and reservoir region 17 so that material under excessive pressure may be vented into the reservoir. For the purpose of establishing a rapid mixing and melting, particularly at start up in cold weather, a hand operated by-pass valve 65 is provided between pipe 62 and the reservoir region 17. Rapid recirculation of material in the reservoir, with valve 65 open, thus occurs and heating is expedited.

Leading from the lower part of the reservoir is a pipe 66 containing a conventional drain valve 67 permitting draining of the apparatus at the termination of use. Leading from the pressure piping is a pipe 68 containing a valve 69 permitting withdrawal of hot fluent material for dispensing in a supplementary manner, as by use with a bucket or the like. However, for normal dispensing, a pipe 44 connecting with recirculating pipe 62 leads material to hose 48 and completely fills that hose. The material under pressure in the hose then moves to a dispensing valve 70 mounted on rod 49. Upon opening of valve 70 material then flows from the hose and makeup material is drawn into the pump from reservoir region 18 through pipe 60.

After the hose is filled and with all valves closed, it will be apparent that excess material supplied by the pump and which cannot enter the hose connection at pipe 44 will be returned to the reservoir.

Referring now to Figs. 5 to 8, an improved means for dispensing the hot material is shown. In prior apparatus of this type with which I am familiar, the operator has been required to manipulate the valve and hose while standing in close contact with the hose. Frequently, the heavy hose is pulled along the paving surface by the towing vehicle and the operator necessarily loses control over the hose movement. Buckling of the hose may occur, throwing the operator off balance and causing him to contact the hose or extraneous hot, sticky material on the hose surface. These conventional disadvantages are removed in the present apparatus. As seen in Fig. 5, the elongated rod 49 carries at one end a valve housing 71 having an apertured valve seat 72 against which a rotatable valve head 73 may be seated. The valve head is mounted on a partially threaded stem 74 engaging a threaded web 75 within housing 71. The stem extends through the entire length of rod 49 and is attached to rotatable handle 76 at the end thereof. By rotation in one direction, the movement of the handle 76 under direct operator control closes the valve 70 and by rotation in the other direction, opens the valve. Suitable handles 77 and 78 are located on rod 49 for holding the dispensing apparatus when conducting the dispensing operation.

The end of extensible hose 48 is flexibly connected to valve housing 71 and supplies material under pressure thereto.

As shown generally in Fig. 5, the hose connection preferably includes a double swivel action permitting the hose to accommodate itself to the movement of rod 49 without impairing the operator's manipulation of the rod. It will also be observed that the operator stands at an appreciable distance from the hot hose, as well as from the hot reservoir. The hose 48 terminates in a conventional coupling 80 rotatably joined to a short elbow pipe section 81. Rotation of the hose around its axis is thus permitted even though the pipe section remains stationary. In turn, the pipe section 81 is rotatably journalled in the side of valve housing 71 so that, as the operator manipulates rod 49, the elbow 81 and elbow coupling 82 may rotate on its axis as required, as seen in Fig. 7. Suitable seals at the junction of the relatively movable parts are provided. The particular construction of the thus described swivel joints form no essential part of the invention, and any conventional forms of joints may be used. It will be observed, however, that the overall lateral length of the swivel connections is relatively short and that the torque exerted upon pulling of the hose 48 along the paving crevice may be readily counterbalanced by the operator while holding handles 77 and 78.

Figure 8:
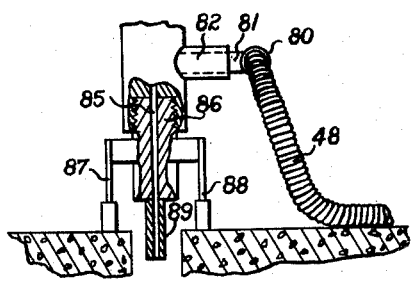
Fig. 8 is a view partly in section showing the valve housing and nozzle in dispensing position at a point of material application.

Material entering valve housing 71 with the valve in fully retracted position passes through aperture 85 in the valve seat and into the dispensing nozzle. This nozzle may take many forms of which a preferred form is shown in Fig. 8. The nozzle body 86 is provided with a hollow threaded extension adapted to be mounted in a threaded aperture in the valve housing 71. Affixed to the sides of the nozzle body are two arcuate shoes 87 and 88 suitably spaced to straddle the crevice into which the plastic material is dispensed. The arcuate shoes permit ready adjustment of the angle of rod 49 with respect to the plane of the pavement. Nozzle body 86 preferably terminates in a fan-shaped enlarged body 89 extending beyond the adjoining shoes and adapted for depositing material into the paving crevice by its extension into that crevice, as best shown in Fig. 8.

With the foregoing description in mind, the operation of the apparatus will be readily apparent to those skilled in the art. Material melted in the reservoir is moved under pressure to the hose which remains completely filled at all times. The material in the hose is maintained in fluent condition by diversion of hot gases into the hose housing and the hose is unreeled to the point of use while the material is still in its fluent condition. The operator inserts the dispensing nozzle in the paving crevice and by means of handle 76 opens valve 70. Material thereupon flows into the crevice and fills the same under the visual control of the operator. As the crevice is filled at a given point the operator moves in the direction of the vehicle and the heavy hose 48 adjusts itself on the paving surface. By resting the dispensing means upon shoes 87 and 88, which in turn rest upon the pavement, the operator is not required to hold the weight of the entire structure. Other types of nozzles, adapted to rest in the paving crevice or adjacent its edges, may be employed, if desired. Moreover, a second operator at the vehicle may move the vehicle or may reel in the surplus hose length during the dispensing operation. By means of the elongated rod 49 the operator is removed from proximity of the hot hose, but without sacrifice of close control over the dispensing operation. Faster and safer work accordingly is accomplished.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the appended claims.

What I claim as new and desire to secure by Letters Patent of the United States is:

1. Apparatus for handling fluent material comprising a heated reservoir for said material, an extensible hose for conducting said material to a point of application, a reel for mounting said hose adjacent said reservoir, a pump for circulating material from said reservoir under pressure and connected to said hose and said reservoir, means for returning excess material from said hose connection to said reservoir, manually movable means for dispensing material from said hose including a valve, and means for operating said valve from a station visually adjacent said point of application but remotely located with respect to both the hose and the reservoir.

2. Apparatus for handling fluent material comprising a reservoir for said material, a hose housing mounted adjacent said reservoir, means for heating said reservoir, means for conducting waste heat from said reservoir to said hose housing, including a means for regulating the supply of said heat to said housing, an extensible hose for conducting material to a point of application, a reel mounting said hose in said housing, a pump for circulating material from said reservoir under pressure and connected to said hose and said reservoir, means for returning excess material from said hose connection to said reservoir, means for dispensing material from said hose, including a valve, and means for operating said valve.

3. Apparatus as defined in claim 2, including a separate pressure relief means and a separate manually operable means for returning material under pressure from the discharge side of said pump to said reservoir.

4. Apparatus as defined in claim 2, including a permeable partition dividing said reservoir into a first region and a second region, means for returning material under pressure from the discharge side of said pump to said reservoir, said material returning means communicating with the first region of said reservoir and said pump connection communicating with the second region of said reservoir.

5. Apparatus as defined in claim 4, wherein said pump is heated by waste heat from said reservoir.

6. Apparatus for handling fluent material comprising a jacketed reservoir for said material containing a heat exchange medium, a hose housing mounted adjacent said reservoir, means for heating the heat exchange medium, means for conducting waste heat from said reservoir to said hose housing, including a means for regulating the supply of said heat to said housing, an extensible hose for conducting material to a point of application, a reel mounting said hose in said housing, a pump for circulating material from said reservoir under pressure and connected through a pipe system to said hose and said reservoir, means for returning excess material from said hose connection through said pipe system to said reservoir, means for dispensing material from said hose including a valve, and means for operating said valve.

7. Apparatus as defined in claim 6 wherein at least a part of said pipe system is mounted within the jacket of said reservoir in contact with said heat transfer medium.

8. Apparatus for handling fluent material comprising a jacketed reservoir for said material containing a heat transfer medium, a permeable partition dividing said reservoir into a first region and a second region, agitating means extending through said reservoir regions for comminuting and stirring material, a hose housing mounted adjacent said reservoir, means for heating the heat exchange medium, means for conducting waste heat from said reservoir to said hose housing including a means for regulating the supply of said heat to said housing an extensible hose for conducting material to a point of application, a reel mounting said hose in said housing, a pump for circulating material from said reservoir under pressure and connected through a pipe system to said hose and to the second region of said reservoir, means for returing excess material from said hose connection through the pipe system to said reservoir, means for dispensing material from said hose including a valve, and means for operating said valve.

9. In an apparatus for dispensing hot, fluent material, a reservoir containing a supply of material, a hose connected to said reservoir for receiving material under pressure, manually operable dispensing means movable as a unit to successive points of material application and including an elongated rod having a handle adjacent one end and a valve housing adjacent a second end, a valve seat in said housing, a nozzle attached to said housing adjacent said valve seat, a retractable valve in said housing, means attached to said dispensing means and disposed adjacent said nozzle for resting said dispensing means upon a surface adjacent the point of material application, means mounted adjacent a first end of said rod for retracting said valve from said seat to permit flow of material into said nozzle and means adjustably connecting said hose to said valve housing whereby said hose may self-adjust its position with respect to the valve housing as the dispensing means is moved to successive points of material application.

10. Apparatus as defined in claim 9, wherein said means for resting said dispensing means comprises spaced arcuate shoes between and beyond which the nozzle mouth is adapted to extend.

References Cited in the file of this patent
UNITED STATES PATENTS 1,134,656    Willet _____ Apr. 6, 1915